(12) United States Patent
Marty et al.

(10) Patent No.: US 8,073,584 B2
(45) Date of Patent: Dec. 6, 2011

(54) METHOD FOR MEASURING DYNAMIC PARAMETERS OF AN AIRCRAFT PROGRESSING OVER AN AIRPORT ZONE

(75) Inventors: Nicolas Marty, Saint Sauveur (FR); Gilles Francois, Toulouse (FR); Hugues Meunier, Frouzins (FR)

(73) Assignee: Thales (FR)

( * ) Notice: Subject to any disclaimer, the term of this patent is extended or adjusted under 35 U.S.C. 154(b) by 993 days.

(21) Appl. No.: 12/016,979

(22) Filed: Jan. 18, 2008

(65) Prior Publication Data

US 2008/0177427 A1 Jul. 24, 2008

(30) Foreign Application Priority Data

Jan. 19, 2007 (FR) .................................. 07 00377

(51) Int. Cl.
*G05D 1/02* (2006.01)
*G01C 11/02* (2006.01)
(52) U.S. Cl. ............... 701/28; 701/3; 701/117; 701/120
(58) Field of Classification Search ..................... 701/28, 701/120
See application file for complete search history.

(56) References Cited

U.S. PATENT DOCUMENTS

| | | | | |
|---|---|---|---|---|
| 5,321,615 A * | 6/1994 | Frisbie et al. | .................... | 701/24 |
| 6,157,876 A | 12/2000 | Tarleton, Jr. et al. | | |
| 6,411,890 B1 * | 6/2002 | Zimmerman | .................. | 701/120 |
| 6,928,363 B2 * | 8/2005 | Sankrithi | .................... | 701/120 |
| 7,006,667 B2 * | 2/2006 | Akutagawa | ................... | 382/104 |
| 7,113,202 B2 * | 9/2006 | Konya | ............................. | 348/117 |
| 7,539,557 B2 * | 5/2009 | Yamauchi | ...................... | 700/245 |
| 7,881,497 B2 * | 2/2011 | Ganguli et al. | ............... | 382/104 |
| 2002/0041229 A1 | 4/2002 | Satoh et al. | | |
| 2007/0156286 A1 * | 7/2007 | Yamauchi | ..................... | 700/245 |
| 2007/0168111 A1 * | 7/2007 | Dubourg | ....................... | 701/120 |
| 2008/0027627 A1 * | 1/2008 | Ikeda et al. | ................... | 701/117 |

FOREIGN PATENT DOCUMENTS

| | | |
|---|---|---|
| DE | 10305993 A | 8/2004 |
| EP | 0409642 A2 | 1/1991 |
| WO | 03001472 A | 1/2003 |

OTHER PUBLICATIONS

S. Ishiwara, H. Kuwamoto, and S. Ozawa, "Visual Navigation of an Autonomous Vehicle Using White line Recognition", IEEE Transactions on Pattern analysis and Machine Intelligence, vol. 10, Issue 5, Sep. 1988, p. 743-749.*

(Continued)

*Primary Examiner* — Thomas Black
*Assistant Examiner* — Lin B Olsen
(74) *Attorney, Agent, or Firm* — Lowe Hauptman Ham & Berner, LLP (57) ABSTRACT

The invention relates to a device for measuring dynamic parameters of an aircraft progressing over an airport zone. The aircraft is in the phase of rolling along a traffic lane. The traffic lane comprises ground markings and notably a center line. The device includes at least one means for acquiring images (101), and means (102) for measuring the deviation of the aircraft with respect to the center line on the basis of the acquired images.

4 Claims, 4 Drawing Sheets

OTHER PUBLICATIONS

Spinei, A. "Estimation due Mouvement Par Triades des Filtres de Gabor. Application au Mouvement D'objects Transparents" (Estimation of Motion by Triads of Gabor Filters. Application to the Motion of Transparent Objects), thesis submitted on Oct. 14, 1998 at INPG, Grenbole.

Negrate, A. Le, A. Beghdadi and K. Belkacem-Boussaid, "Quelques Traitements Bas Niveau Bases Sur Une Analyse du Contraste Local" (Some Lowe Level Processing Based on Analysis of Local Contrast), Proceedings of VI'99, Vision Interface Conference, May 18-21, 1999, Three Rivers Canada, pp. 598-603.

* cited by examiner

FIG.4

METHOD FOR MEASURING DYNAMIC PARAMETERS OF AN AIRCRAFT PROGRESSING OVER AN AIRPORT ZONE

RELATED APPLICATIONS

The present application is based on, and claims priority from, French Application Number 07 00377, filed Jan. 19, 2007, the disclosure of which is hereby incorporated by reference herein in its entirety.

TECHNICAL FIELD

The invention relates to a device for measuring dynamic parameters of an aircraft progressing over an airport zone and, in particular, makes it possible to measure the position and the orientation of the aircraft with respect to ground markings.

BACKGROUND OF THE INVENTION

When an aircraft is moving on the ground, in order to reach the takeoff runway or attain its parking position, it follows traffic lanes (designated by the term taxiway) comprising ground markings standardized by the international organizations and notably a yellow center line. By procedure, the movement of the aircraft is performed under the command of the ground control which assigns the route to each of the aircraft. The crew is in charge of applying the manoeuvre by sight, that is to say by relying on the view at its disposal through the apertures of the flight deck. At night or in degraded meteorological conditions, the crew relies on the luminous aids available on the airport to follow the assigned path, monitor the approach to intersections or runways and to center the aircraft on the taxiway used.

Under particularly unfavourable conditions, known by the OACI terminology as level 4 visibility conditions, the pilot is not in a position to ensure the guidance of his aircraft. In such cases, the current procedure consists in assisting each aircraft with a pilot vehicle which travels in front of it, with a perfect knowledge of the airport and of the route to be followed. The pilot of the aircraft is then reduced to following the luminous signalling means of the pilot vehicle. Having regard to the number of available vehicles and the inability of the aircraft to steer in an autonomous manner, these operations are carried out at highly reduced speeds of movement and with a reduced number of assisted aircraft.

An approach to improving the safety conditions of aircraft movements under such conditions, while maintaining a higher traffic throughput, consists in assisting the pilot to follow the path assigned to him by ground control. Accordingly, it is necessary to provide him with dynamic parameters of the aircraft, relating to the ground markings, such as the position and the orientation of the aircraft or the rolling speed. Several systems, described hereinafter, already make it possible to measure these dynamic parameters but their ground accuracy is not sufficient to aid the pilot or to envisage automatic guidance of the aircraft on the traffic lanes.

Systems of ADIRS type (the initials being the acronym of the expression Air Data Inertial Reference System) are measurement equipment based on pressure measurements performed on various parts of an aircraft, typically at the front and on the sides. The measured pressure differences make it possible to deduce flight parameters such as the speed of the aircraft. These apparatuses are accurate in the flight phase, but in the ground rolling phase, at low velocity, their accuracy degrades appreciably.

Satellite positioning systems such as GPS (Global Positioning System) offer an accuracy of the order of 10 metres, which is insufficient during the rolling phases. This type of system is tied to the visibility of the constellation of satellites and, in the aeronautical context, the receivers have been optimized to guarantee maximum performance during flight, with accuracies of the order of a hundred metres, but with very high integrity. During the rolling phases, the necessary accuracy is sub-metric for the following of a path and one of the particular features of the rolling phases arises from the fact that the locating system also relies on the satellites which are seen on very low orbits above the horizon which have a tendency to degrade the accuracy of the measurement.

Guidance systems based on feedback with respect to database elements are subject to potential database errors and to the accuracy of the aircraft position measurements. The currently available airport databases have neither the accuracy nor integrity necessary for guidance operations. Additionally, the accuracy positioning arrangement requires the use of differential systems. An airport reference point position measurement, performed by a GPS for example, is transmitted to the aircraft. The measurement of the deviation between the aircraft and the reference point greatly reduces the measurement errors. Nevertheless, this technique makes it necessary to equip the aircraft and the airports and does not render the navigation of the aircraft autonomous.

The invention is aimed at alleviating the locating problems cited above by proposing a device and a method, based on the acquisition of images, and making it possible to ascertain the relative position and the orientation of the aircraft with respect to ground markings, that are therefore independent of all databases or means of global location. The use of the device according to the invention affords high accuracy in location and makes it possible to envisage automatic guidance of the aircraft on traffic lanes. The method according to the invention calculates deviations between the aircraft and the center line of the taxiway that it is following. These deviations allow the pilot to guide the aircraft on the ground, including in difficult meteorological conditions. The invention makes it possible to provide the input data necessary to a ground guidance system by relying on a measurement carried out on the real world and which is independent of any system of navigation, location or bases of position charts of airport elements.

SUMMARY OF THE INVENTION

For this purpose, the subject of the invention is a device for measuring dynamic parameters of an aircraft progressing over an airport zone, said aircraft being in the phase of rolling along a traffic lane, said traffic lane comprising ground markings and notably a center line, wherein it comprises:
  at least one means for acquiring images,
  means for measuring the deviation of said aircraft with respect to said center line on the basis of said acquired images, said means for measuring the deviation of said aircraft with respect to ground markings on the basis of said acquired images comprising:
    means for calculating the coordinates of a first straight line supporting the direction of the center line,
    means for calculating an angular deviation XTK between said first straight line and a second straight line supporting the direction of the current trajectory of the aircraft and for calculating a lateral deviation XTE between the first and the second straight line.

Advantageously, the means for acquiring images is composed of at least one radar.

Advantageously, the means for acquiring images is composed of at least one LIDAR.

Advantageously, the means for acquiring images is composed of at least one camera.

Advantageously, the device for measuring dynamic parameters of an aircraft progressing over an airport zone, according to the invention, furthermore comprises means for measuring speed and position of said aircraft on the basis of said acquired images, said speed and position measuring means comprising:

means for measuring the movement of said aircraft,
means for estimating the speed of said aircraft,
means for recognizing ground marking elements on the basis of the acquired images,
means for correlating the recognized ground marking elements with referenced elements $E_r$ in an airport database,
means for consolidating the speed and position calculated with speed $V_e$ and position $P_e$ estimated by other measuring equipment.

We remind that the speed notion includes an oriented speed vector. This oriented speed vector defines implicitly a direction.

Advantageously, the device for measuring dynamic parameters of an aircraft progressing over an airport zone, according to the invention, furthermore comprises means for aiding surface navigation.

Advantageously, the device for measuring dynamic parameters of an aircraft progressing over an airport zone, according to the invention, furthermore comprises display means.

Advantageously, the device for measuring dynamic parameters of an aircraft progressing over an airport zone, according to the invention, furthermore comprises means of guidance of said aircraft.

The subject of the invention is also a method for measuring dynamic parameters of an aircraft progressing over an airport zone, wherein it comprises the following steps:

the calculation of the polar coordinates $(r,\theta)$ of a first straight line supporting the direction of the center line, in an acquired image,
the calculation of an angular deviation XTK between said first straight line and a second straight line supporting the direction of the current trajectory of the aircraft and
the calculation of a lateral deviation XTE between the first and the second straight line.

Advantageously, the calculation of the polar coordinates $(r,\theta)$ of the first straight line comprises the following steps:

the detection of straight lines in the acquired image,
the grouping of said straight lines into sets according to their direction,
if several sets of different directions are created, the choice of a direction to be followed by the aircraft and the calculation of the coordinates of a straight line supporting said direction in a first image reference frame.

Advantageously, the step of detecting straight lines comprises the following steps:

the calculation of a black and white binary image $I_B$ containing solely the contours of the acquired image I,
the application of an algorithm for extracting lines to the black and white binary image $I_B$, making it possible to obtain a third grey level image $I_H$,
the estimation of a number of straight lines n to be detected in the black and white binary image $I_B$,
the search for local maxima in the third image $I_H$,
the determination of the straight lines exhibiting the largest probability of occurrence in the black and white binary image $I_B$, on the basis of the local maxima of the third image $I_H$.

Advantageously, the step of calculating the angular deviation XTK and lateral deviation XTE comprises the following steps:

the calculation of two parameters $(a_1,b_1)$ of the first straight line in the image reference frame on the basis of the polar coordinates $(r,\theta)$ of said first straight line,
the calculation of a first series of points $LP_1$ on the basis of the two parameters $(a_1,b_1)$,
the projection, in an airplane reference frame, of the first series of points $LP_1$ to obtain a second series of points $LP_2$,
the calculation of two parameters $(a_2,b_2)$ of a second straight line in the airplane reference frame passing through the second series of points $LP_2$,
the calculation of the angular deviation XTK and lateral deviation XTE of the two parameters $(a_2,b_2)$.

Advantageously, the method for measuring dynamic parameters of an aircraft progressing over an airport zone, according to the invention, furthermore comprises a preprocessing step comprising the following steps:

the application of a filter to the acquired image I, making it possible to obtain a first less noisy filtered image $I_F$,
the application of a filter of Gaussian Laplacian type to the first filtered image $I_F$, making it possible to obtain a second filtered image $I_L$ where the contours are enhanced.

Advantageously, the method for measuring dynamic parameters of an aircraft progressing over an airport zone, according to the invention, furthermore comprises a ground speed estimation and obstacle detection step comprising the following steps:

the acquisition and the storage of a first image $I_{t-1}$,
the acquisition of a second image $I_t$,
the calculation of optical fluxes on the basis of the first image $I_{t-1}$ and of the second image $I_t$,
the detection of a square encompassing an obstacle, on the basis of the optical fluxes,
the estimation of the speed on the basis of the square encompassing the obstacle,
the determination of the characteristics of the obstacle, comprising notably the distance between the aircraft and the obstacle D, the azimuth or bearing of the obstacle $\rho$ and the height of the obstacle H.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The device according to the invention makes it possible to measure dynamic parameters of an aircraft progressing over an airport zone. The aircraft considered is in the phase of rolling along a traffic lane. Said traffic lane comprises ground markings and notably a center line.

Figure 1:
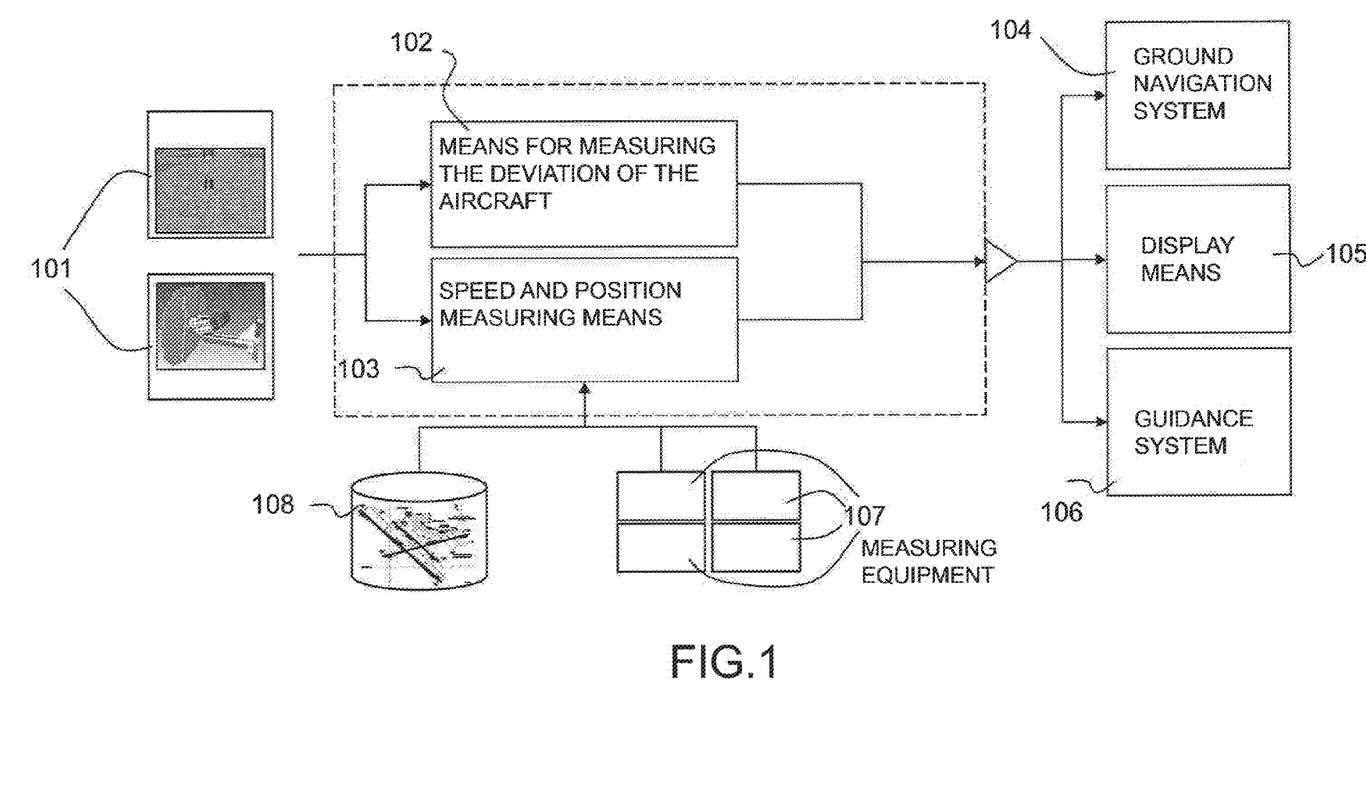
FIG. 1 represents an exemplary embodiment of the device according to the invention.

FIG. 1 represents an exemplary embodiment of the device according to the invention. The device according to the invention comprises:

at least one means for acquiring images 101,
means 102 for measuring the deviation of said aircraft with respect to said center line on the basis of said acquired images.

Figure 2:
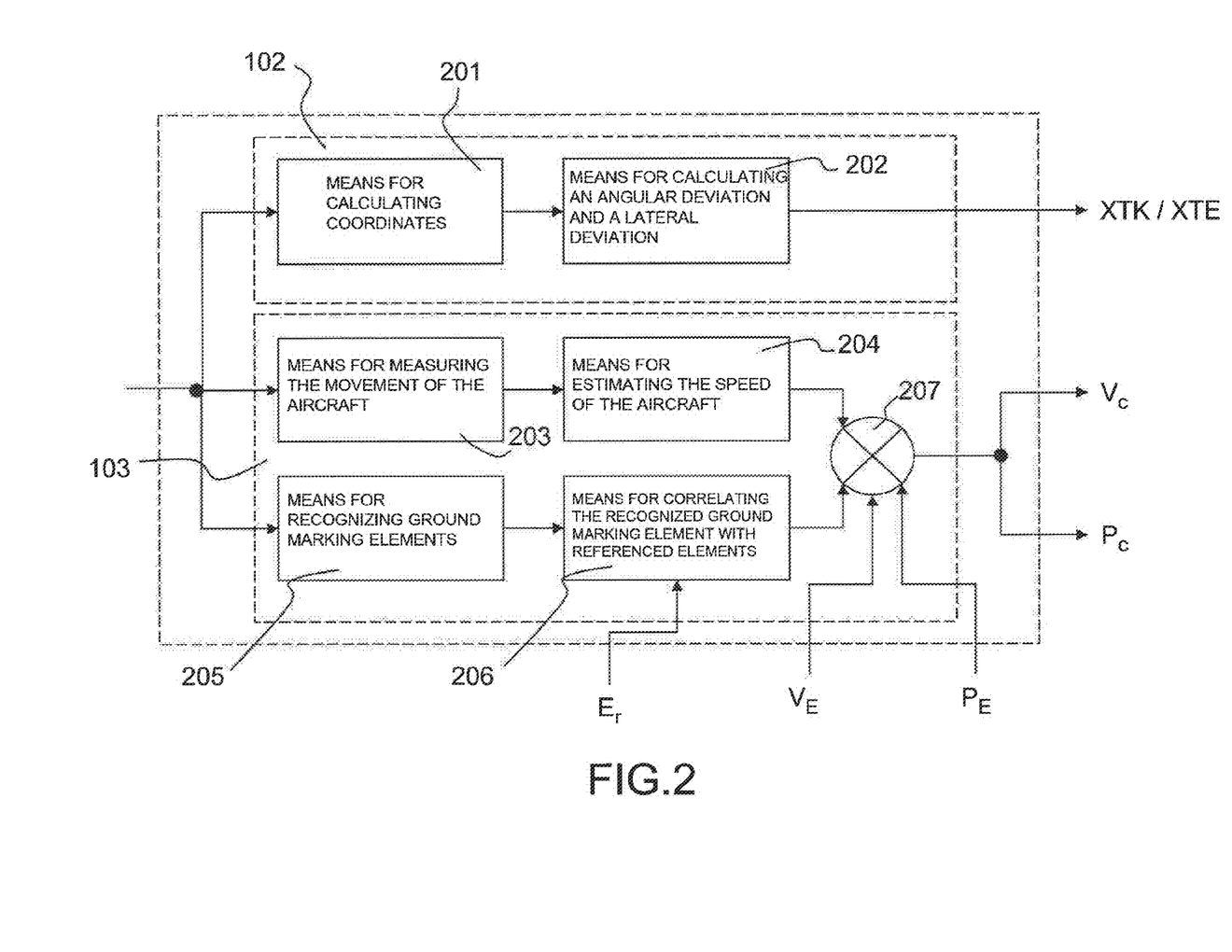
FIG. 2 represents a functional architecture of an exemplary embodiment of the device according to the invention.
Figure 3:
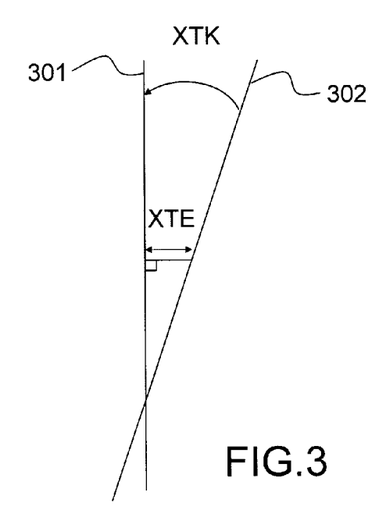
FIG. 3 represents an angular deviation XTK and a lateral deviation XTE between a first straight line supporting the direction of the center line followed by the aircraft and the second straight line supporting the direction of the current trajectory of the aircraft.

The acquisition means 101 can be a video camera or a LIDAR (a radar based on infrared techniques) or a radar, or an assembly of each of these elements. Said aircraft's deviation measurement means 102 consist, on the one hand, of means 201 for calculating the coordinates of a first straight line 301 supporting the direction of the center line and, on the other hand, of means 202 for calculating an angular deviation XTK and a lateral deviation XTE between said first straight line 301 and a second straight line 302 supporting the direction of the current trajectory of the aircraft.

The angular and lateral deviations calculated can be used in a ground navigation system 104 of OANS type (the acronym of the expression "On board Airport Navigation System") or in a monitoring system of ISS type (the acronym of the expression "Integrated Surveillance System").

The calculated angular and lateral deviations are communicated to the pilot via display means 105 which can be of PFD type (the acronym of the expression Primary Flight Display) or of HUD type (the acronym of the expression Head-Up Display), which is a collimated display device allowing the crew to view information projected to infinity through the windscreen of the cockpit.

Finally these deviations are used by a guidance system 106.

Advantageously, the device according to the invention furthermore comprises means 103 for measuring speed and position of said aircraft on the basis of the acquired images. Said speed and position measuring means 103 comprise:

means 203 for measuring the movement of said aircraft,
means 204 for estimating the speed of said aircraft,
means 205 for recognizing ground marking elements on the basis of the acquired images,
means 206 for correlating the recognized ground marking elements with referenced elements $E_r$ in an airport database 108,
means for consolidating the speed and position calculated with speed $V_e$ and position $P_e$ estimated by other measuring equipment 107. This equipment is the measuring equipment cited previously such as the ADIRS or the GPS. A consolidated speed $V_c$ and position $P_c$ are thus obtained.

Figure 4:
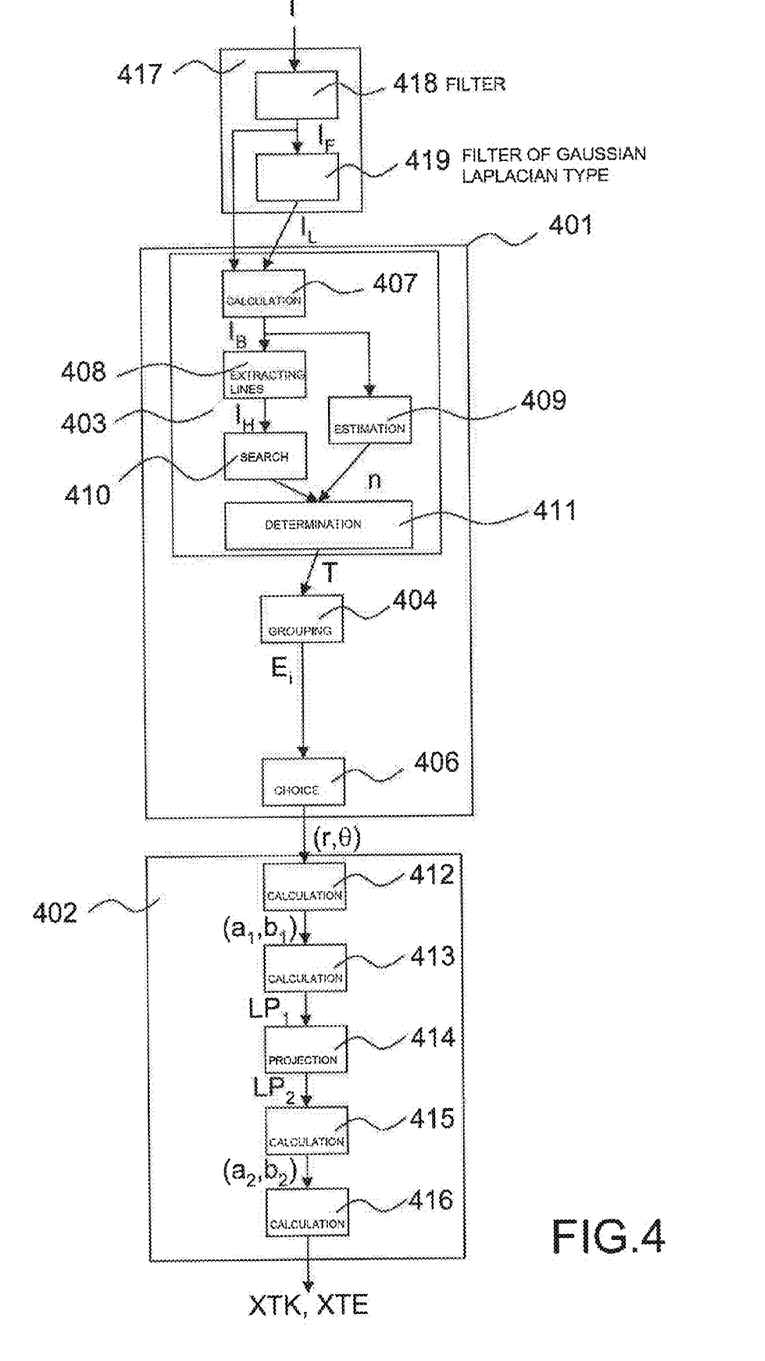
FIG. 4 represents a variant of the method according to the invention.

The subject of the invention is also a method for measuring dynamic parameters of an aircraft progressing over an airport zone. FIG. 4 represents a variant of the method according to the invention. Advantageously, the method according to the invention comprises two main steps:

the calculation 401 of the polar coordinates (r,θ) of a first straight line 301 supporting the direction of the center line, in an acquired image,
the calculation 402 of an angular deviation XTK and of a lateral deviation XTE between said first straight line 301 and a second straight line 302 supporting the direction of the current trajectory of the aircraft.

According to a preferred embodiment, the method for measuring dynamic parameters of an aircraft progressing over an airport zone according to the invention furthermore comprises a preprocessing step 417 comprising the following steps:

the application of a filter 418 to the acquired image I, making it possible to obtain a first filtered image $I_F$ less noisy than the acquired image I,
the application of a filter of Gaussian Laplacian type 419 to the first filtered image $I_F$, making it possible to obtain a second filtered image $I_L$ where the contours are enhanced.

Advantageously, the calculation 401 of the polar coordinates (r,θ) of the first straight line comprises the following steps:

the detection 403 of a set of straight lines T in the acquired image,
the grouping 404 of said straight lines into subsets $E_i$ according to their direction,
if several subsets $E_i$ of different directions are created, the choice 406 of the direction to be followed by the aircraft and the calculation of the polar coordinates (r,θ) of the straight line supporting said direction in a first image reference frame.

Advantageously, the step 403 of detecting straight lines comprises the following steps.

Figure 5A:
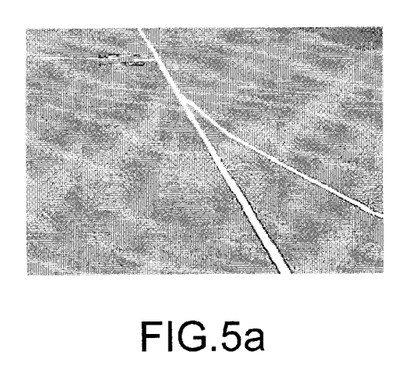
FIGS. 5a and 5b represent respectively a first grey level image and a second black and white image representing the contours of the first grey level image.
Figure 5B:
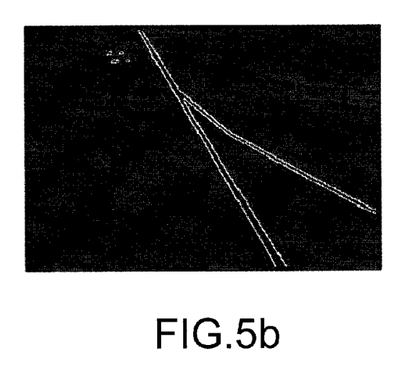

The first step of the detection of straight lines is the calculation 407 of a black and white binary image $I_B$ containing solely the contours of the acquired grey level image I. The extraction of contours carried out during this step is based on local contrast analysis (A. Le Négrate, A. Beghdadi and K. Belkacem-Boussaïd, "Quelques traitements bas niveau bases sur une analyse du contraste local" ["Some low level processing based on analysis of local contrast"], Proceedings of VI'99, Vision Interface Conference, 18-21 May 1999, Three Rivers CANADA). This procedure analyses an image by means of a sliding window. For each position of the sliding window, a measurement of contrast, between the grey level of the center point of the sliding window and an estimation of the mean grey level of the contours in the sliding window, is performed. This contrast measurement makes it possible to determine whether or not the center point belongs to the contour. The colour white is associated therewith if it belongs to the contour, the colour black is associated therewith otherwise. By performing this measurement on all the points of the grey level image I, a second, black and white, binary image $I_B$ is obtained, representing solely the contours of the acquired grey level image I. FIGS. 5a and 5b represent respectively a first grey level image and a second black and white image representing the contours of the first image.

Advantageously, the estimation of the mean grey level of the contours in the sliding window, carried out in the step 407 of calculating the black and white binary image $I_B$, uses the second filtered image $I_L$. This variant makes it possible to decrease the calculation times.

The second step of the detection of straight lines is the application of an algorithm for extracting lines 408 to the black and white binary image $I_B$, making it possible to obtain a third grey level image $I_H$. According to a preferred embodiment, this step is carried out with the aid of a Standard Hough Transform (SHT) which is a conventional procedure for detecting straight lines in an image. In the third grey level image $I_H$, corresponding to the SHT of the second image $I_B$, the higher the grey level of a point with Cartesian coordinates $(r_i, \theta_j)$, the more chance there is that the straight line defined by the polar coordinates $(r_i, \theta_j)$ is present in the second image $I_B$. The straight line search in the second image $I_B$ then corresponds to a search for local maxima, that is to say for points whose grey level is highest, in the third image $I_H$.

The third step of the detection of straight lines is the estimation 409 of a number of straight lines n to be detected in the black and white binary image $I_B$. This estimation is carried out by counting the number of transitions between the black and white points on a line or a set of lines of the image. Each boundary of each straight line visible on the initial image is manifested in the binary image by a double transition from black to white, then from white to black. The number of transitions is measured on a set of reference lines chosen arbitrarily in the initial image as a function of the characteristics of the optical system and having regard to their projection into the reference frame of the aircraft.

For example, the measurement will be performed at least on the straight line corresponding to the optical center of the measurement system defined, corresponding as it does to the zone on which the device gives the best measurement quality.

Advantageously, the measurement may be supplemented with the use of lines of the initial image corresponding to symmetric spacings in the reference frame of the aircraft. For example, if the device defined allows satisfactory measurement in the interval $[-L; +L]$ about the optical center, it will be possible to successively use the initial lines of the image projecting to the distances $\{-L/2, +L/2\}$, then $\{-3L/4, -L/4, +L/4, +3L/4\}$, then $\{-7L/8, -5L/8, -3L/8, -L/8, +L/8, +3L/8, +5L/8, +7L/8\}$, . . . . The number of transitions used for evaluating the number of straight lines in the initial image is the median number of transitions measured for each of the lines used.

The fourth step of the detection of straight lines is the search 410 for local maxima in the third grey level image. Each local maximum corresponds to a straight line in the second image. The points exhibiting the highest grey levels in the third image are selected. Due to the discretization of the space of the Hough transform, numerous local maxima may appear in the neighborhood of a maxima actually corresponding to a straight line detected in the image. They correspond to the set of discretized straight lines that can be plotted using substantially the same pixels, to within discretization errors (aggregated from the initial image, the Hough transform and the accuracy of measuring the straight lines employed). In the space of the Hough transform, close local maxima correspond in fact to:

close parallel straight lines (same $\theta_j$, and $r_i$, close)
convergent straight lines with small orientation deviation ($\theta_j$ close)

Additionally, the straight lines searched for are generally parallel since they correspond to the edges of the path lanes and to the center line. Thus, in the projective space of the aircraft, they are at most three in number and cut one another on the horizon line, this corresponding to the top of the image or for a coordinate of intersection line in the initial image which is negative. Any other case is an artefact related to the discretization and may be eliminated from the subsequent processing.

The fifth step of the detection of straight lines is the determination 411 of a set T of straight lines exhibiting the largest probability of occurrence in the second black and white image $I_B$, on the basis of the local maxima of the third image $I_H$. The n straight lines retained (n is defined by step 409) will be those corresponding to the groupings of the previous step exhibiting the highest probability level in the Hough transform.

The second step of the calculation 401 of the polar coordinates of the first straight line is the grouping 404 into sets $E_i$ of the straight lines of the set T, that were detected in the previous step, according to their direction. Said grouping of the straight lines is carried out with the aid of a neighborhood defined by two thresholds $\delta_r$ and $\delta_\theta$. A first straight line defined by its polar coordinates $(r_1, \theta_1)$ is grouped together in the same set as a second straight line defined by its polar coordinates $(r_2, \theta_2)$ if the following two conditions are satisfied:

$$|r_1 - r_2| \leq \delta_r \text{ and } |\theta_1 - \theta_2| \leq \delta_\theta.$$

The last step 401 of calculating the polar coordinates of the first straight line is the choice 406 of the direction to be followed by the aircraft and the calculation of the coordinates of the straight line supporting said direction in a first image reference frame. Several straight lines of different directions can be identified, notably when the aircraft arrives at the level of an intersection. Several sets of straight lines corresponding to the various possible directions are then obtained. The choice of the direction to be followed is performed by the pilot of the aircraft. For example, the aircraft may arrive at the level of an intersection exhibiting three possible directions: straight ahead, left or right. To go right, the direction exhibiting the highest $\theta$ is sought. To go left, the direction exhibiting the lowest $\theta$ is sought. To go straight ahead, if three directions are detected, the mean of the various values of $\theta$ is calculated and the direction exhibiting the closest $\theta$ is chosen. Otherwise, the $\theta$ closest to 90° is chosen, which corresponds to the ordinate in the airplane reference frame. The polar coordinates $(r, \theta)$ are estimated as a mean of the coordinates of the straight lines belonging to the chosen group.

Advantageously, the step 402 of calculating the angular deviation XTK and lateral deviation XTE comprises the following steps.

The first step of the calculation of the angular and lateral deviations is the calculation 412 of two parameters $(a_1, b_1)$ of the first straight line in the image reference frame on the basis of the polar coordinates $(r, \theta)$ of said first straight line.

The second step of the calculation of the angular and lateral deviations is the calculation 413 of a first series of points $LP_1$ on the basis of the two parameters $(a_1, b_1)$.

The third step of the calculation of the angular and lateral deviations is the projection 414, in an airplane reference frame, of the first series of points $LP_1$ to obtain a second series of points $LP_2$. The switch from the image reference frame to the airplane reference frame consists in fact of three successive changes of reference frame. The first change of reference frame consists in switching from the image reference frame which is discrete to a metric reference frame tied to the camera and called the retina reference frame. The second change of reference frame consists in switching from the retina reference frame which is two-dimensional to a camera reference frame in three dimensions. The last change of reference frame consists in switching from the camera reference frame to the airplane reference frame by performing a rotation and a translation.

The fourth step of the calculation of the angular and lateral deviations is the calculation 415 of two parameters $(a_2, b_2)$ of a second straight line in the airplane reference frame passing through the second series of points $LP_2$. This step is carried out with the least squares procedure.

The last step is the calculation 416 of the angular deviation XTK and lateral deviation XTE. These deviations satisfy the following equations:

$$XTK = \tan^{-1}\left(\frac{a_2 b_3 - a_3 b_2}{a_2 a_3 + b_2 b_3}\right)$$

$$XTE = \sin(XTK) \cdot \left(\frac{\sqrt{(b_2 - b_3)^2 + (a_2 b_2 - b_3(2a_2 - a_3))^2}}{|a_2 - a_3|}\right)$$

where $a_3$ and $b_3$ are the parameters of the straight line supporting the direction of the aircraft.

In practice, the direction of the aircraft corresponds to the ordinate of the airplane reference frame.

Advantageously, the method for measuring dynamic parameters of an aircraft progressing over an airport zone according to the invention furthermore comprises a ground speed estimation and obstacle detection step comprising the following steps.

The first ground speed estimation and obstacle detection step is the acquisition and the storage of a first image $I_{t-1}$. The estimation of the optical fluxes carried out hereinafter requires several images. It is therefore necessary to store a first image.

The second ground speed estimation and obstacle detection step is the acquisition of a second image $I_t$.

The third ground speed estimation and obstacle detection step is the calculation of optical fluxes on the basis of the first image $I_{t-1}$ and of the second image $I_t$. This step is carried out by the procedure of A. Spinei (Estimation du mouvement par triades de filtres de Gabor. Application au mouvement d'objets transparents [Estimation of motion by triads of Gabor filters. Application to the motion of transparent objects], thesis submitted on 14 Oct. 1998 at INPG, Grenoble).

The fourth ground speed estimation and obstacle detection step is the detection of a square encompassing an obstacle, on the basis of the optical fluxes. During translation of the camera in a static scene, the directions of velocity of the points projected onto an image plane converge towards a point called the expansion focus. The detection of an obstacle consists in searching for the points whose directions of velocity do not converge towards the expansion focus.

The fifth ground speed estimation and obstacle detection step is the estimation of the speed on the basis of the square encompassing the obstacle.

The sixth ground speed estimation and obstacle detection step is the determination of the characteristics of the obstacle, comprising notably the distance between the aircraft and the obstacle D, the azimuth or bearing of the obstacle ρ and the height of the obstacle H.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of measuring dynamic parameters of an aircraft progressing over an airport zone including a runway, said method comprising:
   calculating the polar coordinates (r,θ) of a first straight line supporting a direction of center line, in an acquired image, wherein the calculation of the polar coordinates (r,θ) of the first straight line comprises the following steps:
   detecting straight lines in an acquired image,
   grouping said straight lines into sets according to directions of said straight lines,
   if several sets of different directions are created, choosing a direction to be followed by the aircraft and calculating the coordinates of a straight line supporting said direction in a first image reference frame, and
   calculating an angular deviation XTK between said first straight line and a second straight line supporting the direction of a current trajectory of the aircraft and calculating a lateral deviation XTE between the first straight line and the second straight line,
   wherein the step of detecting the straight lines comprises the following steps:
   calculating a black and white binary image ($I_B$) containing solely the contours of the acquired image (I),
   applying an algorithm for extracting lines to the black and white binary image ($I_B$), making it possible to obtain a third grey level image ($I_H$),
   estimating a number of straight lines (n) to be detected in the black and white binary image ($I_B$),
   searching for local maxima in the third image ($I_H$), and
   determining the straight lines exhibiting the largest probability of occurrence in the black and white binary image ($I_B$), on the basis of the local maxima of the third image ($I_H$).

2. The method according to claim 1, wherein the step of calculating the angular deviation XTK and lateral deviation XTE comprises the following steps:
   calculating two parameters ($a_1,b_1$) of the first straight line in the image reference frame on the basis of the polar coordinates (r,θ) of said first straight line,
   calculating a first series of points ($LP_1$) on the basis of the two parameters ($a_1,b_1$),
   projecting, in an airplane reference frame, of the first series of points ($LP_1$) to obtain a second series of points ($LP_2$),
   calculating two parameters ($a_2,b_2$) of a second straight line in the airplane reference frame passing through the second series of points ($LP_2$), and
   calculating the angular deviation XTK and lateral deviation XTE on the basis of the two parameters ($a_2,b_2$).

3. The method according to claim 1, further comprising a preprocessing step that includes the following steps:
   applying a filter to the acquired image (I), making it possible to obtain a first less noisy filtered image ($I_F$),
   applying a filter of Gaussian Laplacian type to the first filtered image ($I_F$), making it possible to obtain a second filtered image ($I_L$) where the contours are enhanced.

4. The method according to claim 1, further comprising a ground speed estimation and obstacle detection step on a basis of a square encompassing an obstacle that includes the following steps:
   acquiring and storing of a first image ($I_{t-1}$),
   acquiring a second image ($I_t$),
   calculating optical fluxes on the basis of the first image ($I_{t-1}$) and of the second image ($I_t$),
   detecting the square encompassing the obstacle, on the basis of the optical fluxes,
   estimating the speed on the basis of the square encompassing the obstacle, and
   determining the characteristics of the obstacle, comprising a distance between the aircraft and the obstacle D, the azimuth or bearing of the obstacle ρ and the height of the obstacle H.

* * * * *